(12) United States Patent
Koushanfar et al.

(10) Patent No.: US 8,054,098 B2
(45) Date of Patent: *Nov. 8, 2011

(54) LIGHTWEIGHT SECURE PHYSICALLY UNCLONABLE FUNCTIONS

(75) Inventors: Farinaz Koushanfar, Houston, TX (US); Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/984,275

(22) Filed: Jan. 4, 2011

(65) Prior Publication Data

US 2011/0095782 A1 Apr. 28, 2011

Related U.S. Application Data

(63) Continuation of application No. 12/551,209, filed on Aug. 31, 2009, now Pat. No. 7,898,283.

(51) Int. Cl.
*H03K 19/00* (2006.01)

(52) U.S. Cl. .............................................. 326/8; 326/47

(58) Field of Classification Search .......... 326/8, 37–38, 326/41–47; 726/2, 3
See application file for complete search history.

(56) References Cited

U.S. PATENT DOCUMENTS

| | | | |
|---|---|---|---|
| 7,242,217 | B2 | 7/2007 | Van Wageningen et al. |
| 7,681,103 | B2 | 3/2010 | Devadas et al. |
| 2009/0083833 | A1 | 3/2009 | Ziola et al. |

OTHER PUBLICATIONS

Majzoobi, M. et al., "Techniques for Design and Implementation of Secure Reconfigurable PUFs," ACM Transactions on Reconfigurable Technology and Systems (TRETS), Mar. 2009, 33 pages, vol. 2, No. 1.
Majzoobi, M. et al., "Lightweight Secure PUFs," IEEE/ACM International Conference on Computer-Aided Design, (ICCAD 2008), Nov. 2008, pp. 670-673.
Bolotnyy, L. et al., "Physically Unclonable Function-Based Security and Privacy in RFID Systems," Fifth Annual IEEE International Conference on Pervasive Computing and Communications (PerCom '07), Mar. 2007, pp. 211-220.
Gassend, B. et al., "Controlled Physical Random Functions," 18th Annual Computer Security Applications Conference, Dec. 2002, pp. 149-160.
Gassend, B. et al., "Silicon Physical Random Functions," Proceedings of the Computer and Communication Security Conference, Nov. 2002, pp. 148-160.
Gassend, B. et al., "Delay-based Circuit Authentication and Applications," The Eighteenth Annual ACM Symposium on Applied Computing, Mar. 2003, pp. 294-301.

(Continued)

*Primary Examiner* — James H Cho
(74) *Attorney, Agent, or Firm* — Schwabe, Williamson & Wyatt, P.C.

(57) ABSTRACT

Embodiments generally describe techniques for an integrated circuit having a physical unclonable function (PUF). Example integrated circuits may include an input circuit having an input network, a configurable delay circuit having one or more configurable delay chains, and an output circuit having one or more arbiters, serially coupled together. Each delay chain may include a number of serially coupled configurable switching-delay elements adapted to receive, configurably propagate, and output two delayed signals. Each delay chain may be configured using configuration signals responsively output by the input network in response to challenges provided to the input network. The output circuit may further include an output network to generate combined output signals based on the signals output by the arbiters. Each of the input and/or output networks may comprise combinatorial logic, sequential logic, or another PUF, which may be of the same design. Other embodiments may be disclosed and claimed.

18 Claims, 6 Drawing Sheets

OTHER PUBLICATIONS

Gassend, B. et al., "Identification and Authentication of Integrated Circuits," Concurrency and Computation: Practice and Experience, Aug. 2004, pp. 1077-1098.

Guajardo, J. et al., "FPGA Intrinsic PUFs and their Use for IP Protection," Cryptographic Hardware and Embedded Systems (CHES 2007), Aug. 2007, pp. 63-80.

Lee, J. W. et al., "A Technique to Build a Secret Key in Integrated Circuits for Identification and Authentication Applications," Proceedings of the Symposium on VLSI Circuits, Jun. 2004, pp. 176-179.

Alkabani, Y. et al., "Remote activation of ICs for piracy prevention and digital right management," Proceedings of the 2007 IEEE/ACM international conference on Computer-aided design, Nov. 2007, pp. 674-677.

Feldhofer, M. et al., "A Case Against Currently Used Hash Functions in RFID Protocols," On the Move to Meaningful Internet Systems 2006: OTM 2006 Workshops, Oct. 2006, pp. 372-381.

Majzoobi, M. et al., "Lightweight Secure PUFs," Abstract of Rice University Technical Report, 2008.

Majzoobi, M. et al., "Testing Techniques for Hardware Security," IEEE International Test Conference 2008, Oct. 2008, 10 pages.

Sedcole, P. et al., "Within-die Delay Variability in 90nm FPGAs and Beyond," IEEE International Conference on Field Programmable Technology 2006, Dec. 2006, pp. 97-104.

Suh, G. et al., "Physical Unclonable Functions for Device Authentication and Secret Key Generation," Proceedings of the 44th annual Design Automation Conference, Jun. 2007, pp. 9-14.

Trimberger, S., "Trusted Design in FPGAs," Proceedings of the 44th annual Design Automation Conference, Jun. 2007, pp. 5-8.

Office Action, issued in U.S. Appl. No. 12/551,209, mailed Jun. 18, 2010, 6 pages.

Notice of Allowance, issued in U.S. Appl. No. 12/551,209, mailed Oct. 5, 2010, 6 pages.

LIGHTWEIGHT SECURE PHYSICALLY UNCLONABLE FUNCTIONS

CROSS REFERENCE TO RELATED APPLICATION(S)

This application is a continuation of prior application Ser. No. 12/551,209, filed Aug. 31, 2009, which is now U.S. Pat. No. 7,898,283, the entirety of which is hereby incorporated herein by reference for all purposes.

BACKGROUND

Embedded systems may be under strict power, cost, and size constraints, and therefore often employ lightweight security protocols. Further, they may be incorporated into mobile devices, and may be particularly vulnerable to physical attacks. Silicon physically unclonable functions (PUFs) leverage intrinsic manufacturing variability of deep submicron technology to create and provide single cycle, low-power and low-area security mechanisms. Since each PUF may be unique, two PUFs with the same basic design that receive the same challenge input may produce different responses. Thus, PUFs may be relatively effective at performing traditional security tasks such as authentication, digital rights management tasks related to FPGA security, remote enabling and disabling, and proof of software execution on a certain processor.

PUFs made of a single delay path constructed of a series of two-input/two-output switches may be potentially predictable, susceptible to induced operational conditions, and/or may be easily reverse-engineered. Attempts to fix these issues have included adding feed-forward arbiters to the PUF structures in order to introduce non-linear properties to PUF behavior. Other attempts to fix these issues have included adding interface hash-functions to the PUF structures. But these attempts may be considered to have limited effectiveness. In particular, hash functions may take up significant chip space and may introduce latency. Also, PUFs with non-linearity from the use of feed-forward arbiters may still be considered insecure.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF EMBODIMENTS

Figure 1:
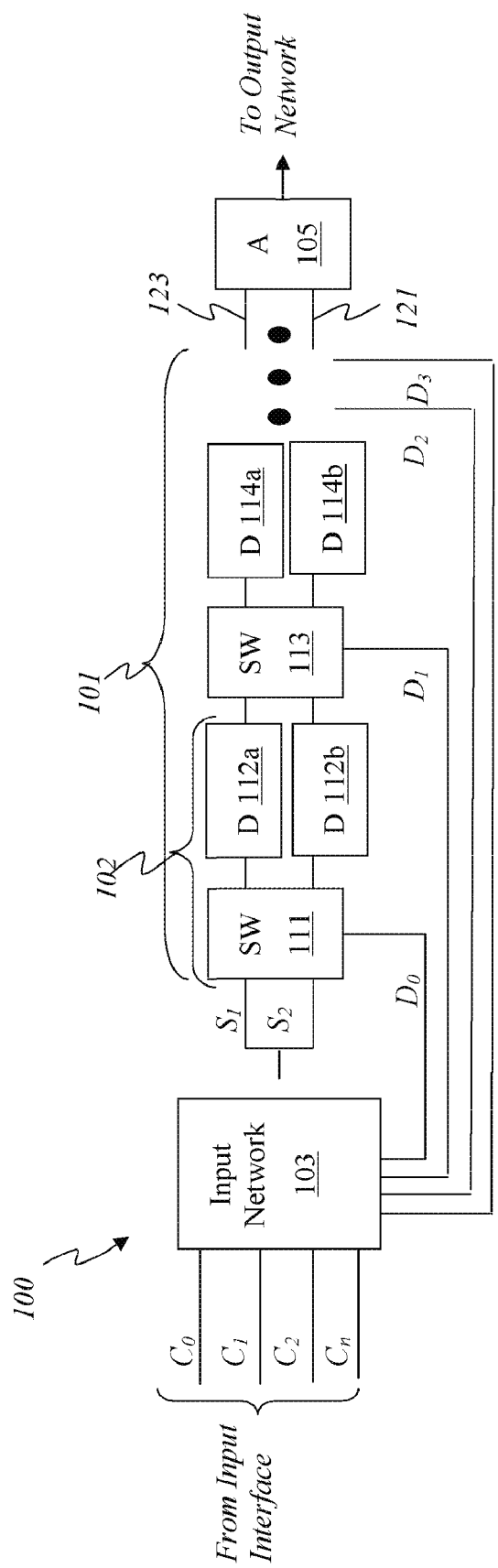
FIG. 1 illustrates selected aspects of a PUF having an input network of an input circuit, a configurable delay chain of a delay circuit and an arbiter of an output circuit in accordance with various embodiments of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to lightweight secure PUF. In the following detailed description, reference is made to the accompanying drawings which form a part hereof, and in which are shown by way of illustration embodiments in which embodiments may be practiced. It is to be understood that other embodiments may be utilized and structural or logical changes may be made without departing from the scope of the disclosure. Therefore, the following detailed description is not to be taken in a limiting sense, and the scope of embodiments is defined by the appended claims and their equivalents Embodiments of the present disclosure provide a PUF structure that may be relatively more secure than conventional designs. Various embodiments may include an input circuit, a configurable delay circuit, and an output circuit, serially coupled together. In various embodiments, the configurable delay circuit may include one or more parallel configurable delay chains. Each parallel delay chain may include a number of serially coupled switching-delay elements. Each switching-delay element may include a switch and one or more delay elements. Each parallel delay chain may be fronted by the input network of the input circuit, configured to combine challenge bits and to produce obfuscated inputs—referred to herein as selector or configuration bits—to switching-delay elements within the delay chain. These switching-delay elements of the delay chains may all have the same or a similar design or arrangement, but manufacturing variations may cause slightly different delay characteristics in each.

In embodiments, the input network may be configured to provide different configuration bits to each input configurable delay chain based at least in part of a unique or semi-unique order of the N challenge bits. This may make it more difficult for an attacker with knowledge of the PUF input network's structure to predict the input network's behaviors. The input network may substantially achieve strict avalanche criterion, wherein any single change in the challenge bits may produce a 0.5 probability of flipping any delay circuit output bit. Having multiple parallel delay chains may result in decreased deviation from a 0.5 transition probability. Experimental results have shown that embodiments having three parallel rows or series of 32 switching-delay elements, may have a 0.5 transition probability variance approximately between 0.002 and 0.003. In various embodiments, the output circuit may include one or more arbiters coupled to the one or more delay chains of the delay circuit to received delay signals from the corresponding last switching-delay elements of the delay chains. In various embodiments, the output circuit may further include an output network coupled to the arbiters—such as an output network comprising multiple XOR elements—may reduce the potential for the output probability distortion that may result if one of the switches of one of the delay circuits of a PUF structure has an outlier delay characteristic (e.g. much higher or much lower than an average delay characteristic). Output networks according to embodiments may obfuscate such outliers, or otherwise reduce the likelihood that an attacker could exploit an outlier if one exists. In various embodiments, each of the input and output networks may include combinatorial logic, sequential logic, and/or another PUF.

FIG. 1 illustrates selected aspects of a PUF having an input network of an input circuit, a configurable delay chain of a configurable delay circuit, and an arbiter of an output circuit in accordance with various embodiments of the present disclosure. PUF 100 includes an input network 103 of an input circuit, a configurable delay chain 101 of a configurable delay circuit, and an arbiter 105 of an output circuit, coupled to each other as shown.

Delay chain 101 of the delay circuit may include a plurality of switching-delay elements 102, serially coupled to each other as shown. Each switching-delay element may include a two-input/two-output switches 111 or 113, followed by two parallel sequences of delay elements 112a-112b or 114a-114b. Switch 111 may be configured to accept signals S1 and S2 on a first and second input, respectively. Switch 111 may also be configured to accept one of N selector bits output from input network 103 (in this case, selector bit $D_0$). All switches 111-113—including switch 111—may be configured to selectively pass the signal received on its first signal to one of two outputs. For example, if the selector bit input is at a first level (for example a binary "0"), the switches may be configured to pass the signal received on the first input to the first output. The switches may also be configured—again with the selector bit at the first level—to pass the signal received on the second input to the second output. Conversely, if the challenge bit input is at a second level (for example a binary "1"), the switches may be configured to pass the signal received on the first input to the second output, and to pass the signal received on the second input to the first input. In alternate embodiments, the first level of the selector bit input may be a binary "1" and the second level of the selector bit input may be a binary "0". Delay elements 112a-112b and 114a-114b may be configured to delay propagation of the two signals. Delay elements 112a-112b and 114a-114b may be configured with e.g., inverters.

Arbiter 105 of the output circuit may be configured to receive from the last switch of the plurality of chain of switches two signals on two different inputs. Arbiter 105 may be configured to output a first output signal level (e.g. a binary "0" or "1") if the signal received on a first input 121 is received first. The arbiter may output a second output signal level, different from the first output signal level, if the signal received on the first input 121 is received after the signal received on the second signal input 123. Each switching-delay element in delay chain 101 may have delay characteristics different from one another. Furthermore, each switching-delay element may have different delay characteristics depending on the value of selector bits $D_0$-$D_N$ input into them. Thus, the various states of the various selector bits may ultimately determine whether the signal received on the first input 121 of arbiter 105 is received before or after the signal received on the second input 123 of arbiter 105. In embodiments, the output(s) of arbiter 150 may be coupled to such other elements via an output network as described more fully below.

Input network 103 of the input circuit may be configured to accept a plurality of N challenge bits $C_0$-$C_N$ on a plurality of input lines coupled to an input interface of an integrated circuit having the illustrated secure PUF. Input network 103 may be configured to logically combine these challenge bits and to produce N selector bits $D_0$-$D_N$ based at least on the logical combination. In embodiments, input circuit 103 may comprise a plurality of exclusive—or (XOR) logical elements, or some other combinational logic. In various embodiments, sequential logic may be used for input circuit 103. Although input network 103 is shown in FIG. 1 accepting 4 challenge bit inputs and outputting 4 selector bits, various embodiments are not limited to input networks that accept N challenge bits and output N selector bits. Thus, input network 103 may be configured to accept N challenge bits and output O selector bits. In various embodiments, input circuit 103 may be itself a sequential network having combinational gates and sequential elements (e.g., flip flops, latches, arbiters, and others) and/or any type of PUF (e.g., a feedforward PUF or lightweight PUF).

Figure 2:
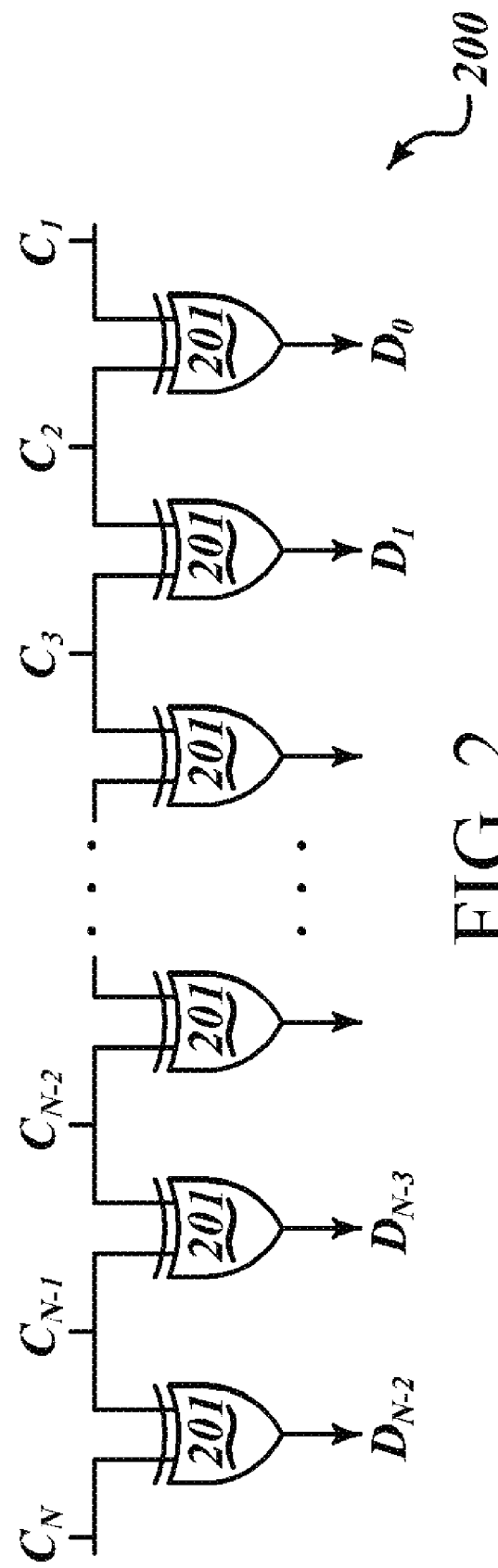
FIG. 2 illustrates an input network of an input circuit having an exclusive—or network according to various embodiments of the present disclosure.

FIG. 2 illustrates an input network having an exclusive-or (XOR) network according to various embodiments of the present disclosure. The input network 200 may include one or more XOR logic elements 201. Except for the first and last challenge bit $C_1$ and $C_n$, two logic elements 201 may be configured to receive a shared challenge bit $C_X$ as input. As shown in FIG. 2, for example, the right-most XOR logic element 201 and its neighbor to the left may each be configured to receive challenge bit $C_2$. In some embodiments, not all XOR logic elements 201 may share a challenge bit input with any other XOR logic elements 201. Some XOR logic elements 201 may share challenge bit inputs with more than one other XOR logic element 201. Some XOR logic elements 201 may be configured to receive more than two challenge bit inputs. Some or all XOR logic elements 201 may be configured to output selector bit outputs such as $D_1$, $D_2$, etc, based at least on the results of the XOR operations. In various embodiments, input network 200 may be configured to accept N challenge bits and output O challenge bits, where N and O are not necessarily the same, although they may be.

PUF having input network 103 may satisfy Strict Avalanche Criterion (SAC). A function is said to satisfy SAC if, whenever a single input bit is complemented, each of the output bits change with a probability of one half. The avalanche property of the linear delay-based PUF may be represented by Equation 1, where a Transformation T is defined as in equation 2.

$$\sum_{i=1}^{N} (-1)^{\rho_i^N} \delta_i + \delta_{N+1} \begin{matrix} r=0 \\ < \\ > \\ r=1 \end{matrix} 0. \quad (1)$$

$$\rho_i^j = \bigoplus_{X=i,i+1,\ldots,j} c_x = c_i \oplus c_{i+1} \oplus \ldots \oplus c_j \quad (2)$$

Where $d_i$ is the time difference between the top and bottom delay elements in stage i; $d_{N+1}$ is the time difference between the top and bottom delay element in stage N+1; $r_i$, and $r_j$ is the number of multiplexers after stage i (including stage i) and before stage j (including stage j) that are set to invert delay paths. In various embodiments, it may be assumed that the differential delay values ($\delta$) in Equation 1 come from independent and identically-distributed Gaussian random variables with zero mean; i.e., $\delta i \sim N(0, \sigma 2)$.

Equations 1 and 2 may be employed to find the probability that a particular PUF output flips given that a challenge bit in the PUF input is flipped. Whenever a challenge bit value flips, some of the terms in Equation 1 change sign (as a result of a change in the corresponding p values). The set that contains the indices of ρs that (do not) flip as a result of a flip in the $k^{th}$ challenge bit are denoted by Γk (Λk). If the absolute value of the sum of terms whose indices are in Γk is greater than the absolute value of the sum of terms whose indices are in Λk, then the summation changes sign (i.e. output flips) whenever ck flips. It may be shown that if equation 3 is satisfied, then (almost) half of ρs in Equation 1 flip as a result of a flip in $k^{th}$ challenge bit (ck), and the output of the PUF would flip with a probability of 0.5.

$$|\Gamma_k| = \frac{N+1}{2} \quad (3)$$

This property generally may not hold for a parallel PUF structure. The ρs values in Equation 1 may be related to challenges by the transformation T defined in Equation 2, i.e., P=T(C). A flip in $c_k$ may cause a flip in $p_j$, where j<k. Thus $|\Gamma_k|$=k. For example, if a flip in $C_N$ happens, then all $\rho_s$ may flip as a result. Hence, Equation 3 may not be satisfied for the parallel PUF structure. A transformation G(C) that, combined with T, meets the criterion set by Equation 3 may be defined where P=T(G(C)) satisfies $|\Gamma_k|$=N+1 for all k.

Therefore, SAC may be achievable by applying a constraint on the challenges so that whenever a challenge bit flips, another challenge bit at locations $$\frac{N+1}{2}$$

apart also flips. In other implementations, different approximations may be employed. For example, if N is an even integer, then G may be:

$$C_{\frac{N+i+1}{2}} = d_i, \text{ for } i = 1 \quad (4)$$

$$C_{\frac{i+1}{2}} = d_i \oplus d_{i+1}, \text{ for } i = 1, 3, 5, \ldots, N-1$$

$$C_{\frac{N+i+2}{2}} = d_i \oplus d_{i+1}, \text{ for } i = 2, 4, 6, \ldots, N-2$$

In some implementations, the logic network shown in FIG. 2 may be configured to carry out this transformation. In addition to the expectation of $X_k$ being equal to 0.5, values of $X_k$ may be sought that have as small of a variance as possible. For example, the smaller the variations from 0.5, the closer a device may come to meeting SAC. The variance of $X_k$ may be related to the number of switches and to the variance of S which may be determined by the technology used to fabricate the PUF and the amount of process variation. Lower variance for $X_k$ may be achieved by adding to the number of switches or by incorporating multiple rows or series of the same structure as will be explained later.

Figure 3:
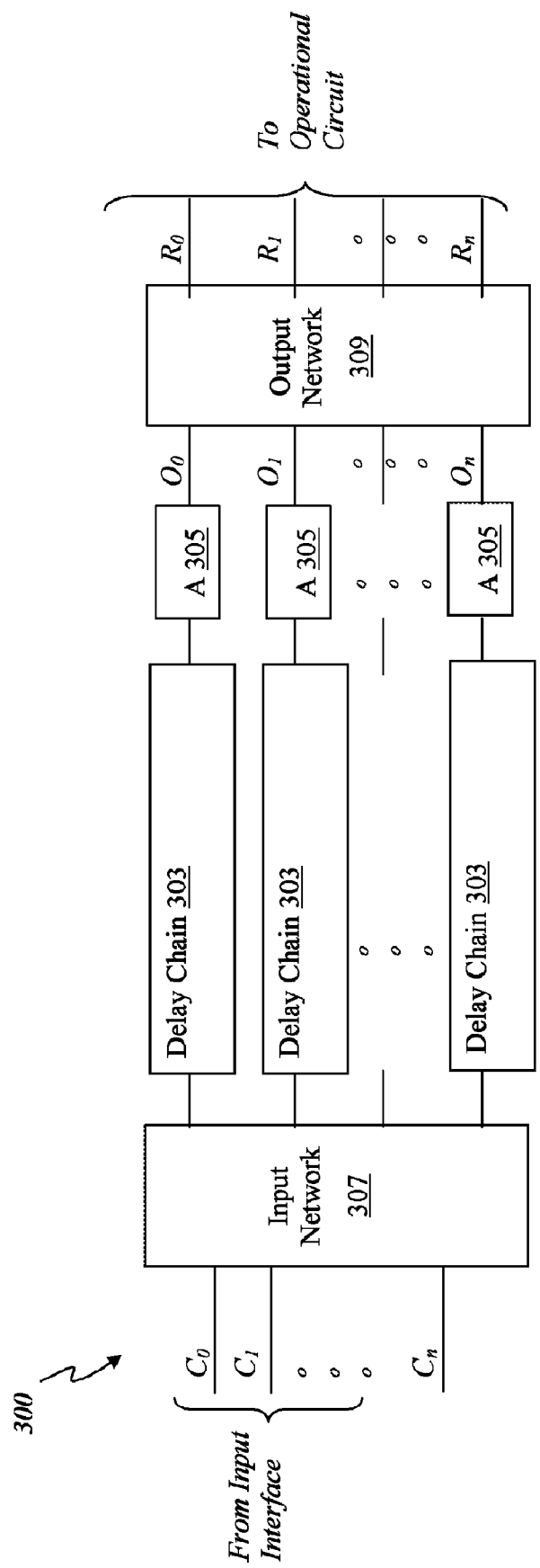
FIG. 3 illustrates a PUF, having an input circuit with an input network, a configurable delay circuit with multiple rows of configurable delay chains, and an output circuit with arbiters and an output network in accordance with various embodiments of the present disclosure.

FIG. 3 illustrates a PUF having an input circuit with an input network, a configurable delay circuit with multiple rows or series of delay chains, and an output circuit with arbiters and an output network, in accordance with various embodiments of the present disclosure. PUF 301 may include input network 307 of an input circuit and configurable delay chains 303 of a configurable delay circuit. Input network 307 and delay chains 303 may be the same or similar as such devices described earlier. Embodiments may include input network 307 configured to accept N challenge bits and output different M configuration bits to each of the configurable delay chains 303, based at least in part on a unique or semi-unique order of the N challenge bits. In alternate embodiments, input network 307 may be configured to accept the N challenge bits, and to output more or fewer bits to each of the configurable delay chains 303. In various embodiments, PUF 301 may comprise arbiters 305 and output network 309 of an output circuit. Arbiters 305 may be configured to accept output signals from each of the delay chains 303. In various embodiments, the number of delay chains 303 and arbiters 305 may be the same or different. Output network 309 may be configured to receive output signals of arbiters 305. In some embodiments, output network 309 may be configured to logically combine each of output signals of the arbiters and to output response bits $R_1$ through $R_M$ based on the combine. Output network 309 may be comprised of a combinatorial network, such as XOR gates or others. Output network 309 may be comprised of another PUF. Output network 309 may be comprised of sequential logic. Whether combinatorial logic, sequential logic and/or another PUF is employed, output network 309 may be configured to reduce the correlation between the output response bits $R_1$ through $R_M$. Further, output network 309 may be configured to provide security to an integrated circuit against statistical and machine learning attacks. Still further, output network 309 may be configured to provide the security taking into consideration operational and/or design parameters, such as reducing power consumption. In various embodiments, the number of combined signals output by the output network may be less, the same or more than the number of signals output by the arbiters. Having the output network output a different number of signals than the arbiters may increase the difficulty of reverse engineering.

Figure 4:
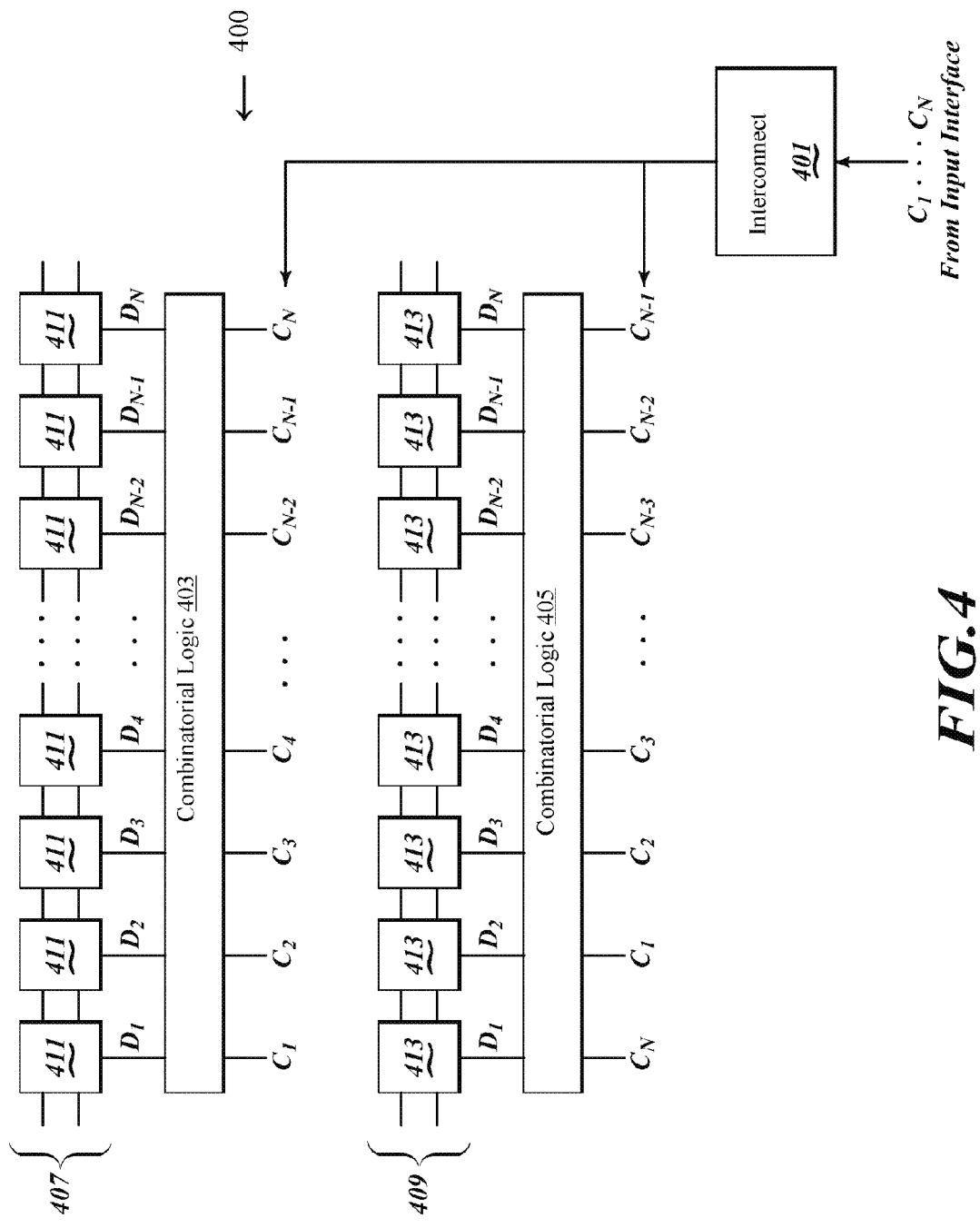
FIG. 4 illustrates the provision of shared challenge bits to two configurable delay chains in a different order in accordance with various embodiments of the present disclosure.

FIG. 4 illustrates the provision of shared challenge bits to configurable delay chains in a different order in accordance with various embodiments of the present disclosure. Input network 400 of an input circuit may include interconnect 401 and combinatorial logic 403 and 405 coupled to each other and switches of different parallel delay chains 407 and 409 as shown. As described elsewhere within this specification, combinatorial logic 403 and 405 may be configured to accept challenge bits as inputs, logically combine them, and output N selector bits to individual ones of switches 411 or 413 of the parallel delay chains 407 and 409, based on the logical combination. Combinatorial logic 403 and 405 may each be configured to receive the same N challenge bits in an order that differs from one another, by coupling combinatorial logic 403 and 405 to interconnect 401. In various embodiments, each of the combinatorial logic may receive the N challenge bits in a unique order. In other embodiments, some but not all combinatorial logic may receive the N challenge bits in a unique order. In various embodiments where an interconnect is employed, the interconnect may be configured to perform a circular-shift interconnection scheme, as is depicted for example in FIG. 4. In some embodiments, combinatorial logic 403 may be configured to accept M challenge bits and output O selector bits, where M and O are different. In various embodiments, sequential logic may be employed in lieu of or in addition to the combinatorial logic. In still other embodiments, another PUF may be used in lieu of the sequential and/or combinatorial logic.

Embodiments having an input network or other scheme employed to provide the challenge bits as illustrated in FIG. 4, may substantially satisfy SAC. The challenge bit provision rule may be expressed formally as follows, where $c_i^m$ is the i-th challenge bit in the m-th row, $\Omega=\{1, 2, \ldots, N\}$, and $j=g_m(i)_1$ g: $\Omega \rightarrow \Omega$ is a one-to-one permutation function.

$$=c_i^m=c_j^{m+1} \text{ for } i,j \in \Omega, m=1, 2, \ldots, Q-1 \quad (5)$$

Figure 5:
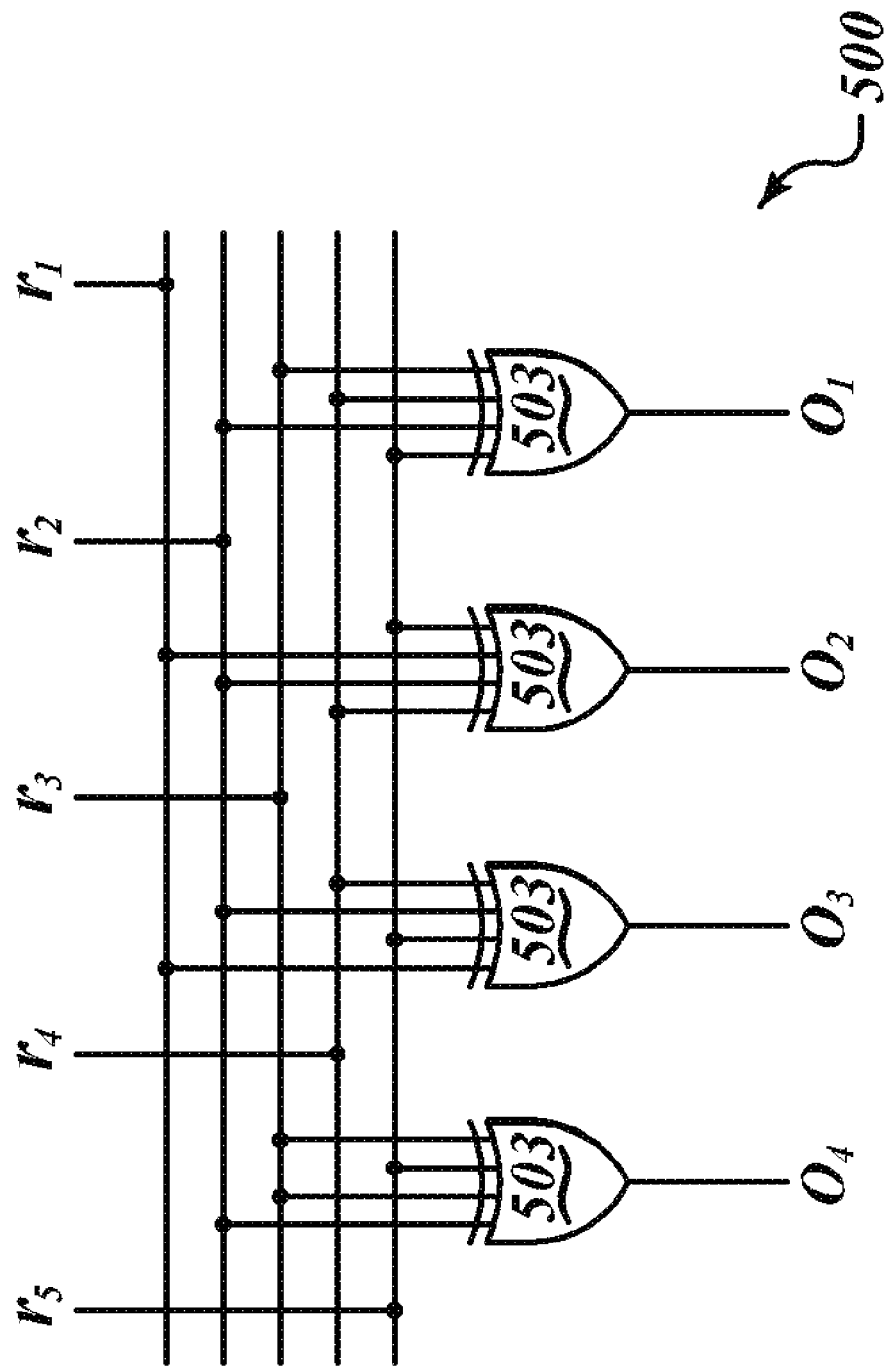
FIG. 5 illustrates an output network of the output circuit in accordance with various embodiments of the present disclosure.

FIG. 5 illustrates an output network of an output circuit in accordance with various embodiments of the present disclosure. Output network 500 may be configured to receive signals $r_1$-$r_N$ from a plurality of arbiters of delay networks. Each XOR logic element 503 may be configured to accept two or more of signals $r_1$-$r_N$ in a unique order and to output one of response bits $R_0$-$R_N$ depending on the results of the XOR operation. Output networks according to some embodiments may be comprised of combinatorial logic that differs from that shown in FIG. 5. Furthermore, the number of response bit inputs $r_x$ input into output networks according to some embodiments may either be the same or different than the number of response bits $R_y$.

The output network may perform a mapping denoted by H(.) from PUF arbiter output signals, r, to produce response bits R. The mapping may be defined as $R=H(R)$, H: $B^Q B^{Q'}$ where $B=\{0,1\}$ and $Q'<Q_1$ and $$o_j = \bigoplus_{i=1,\ldots,x} r_{(j+s+i) \bmod Q} \quad (6)$$

for $j = 1, 2, \ldots, Q'$

Where $\oplus$ denotes a parity generator function and s indicates a shifting step. The transformation may calculate a parity value for sets of x-adjacent arbiter output signals where sets are circularly shifted by s bits with respect to each other. The transformation may be parameterized by s (the shifting operations) and x (the parity input size).

Figure 6:
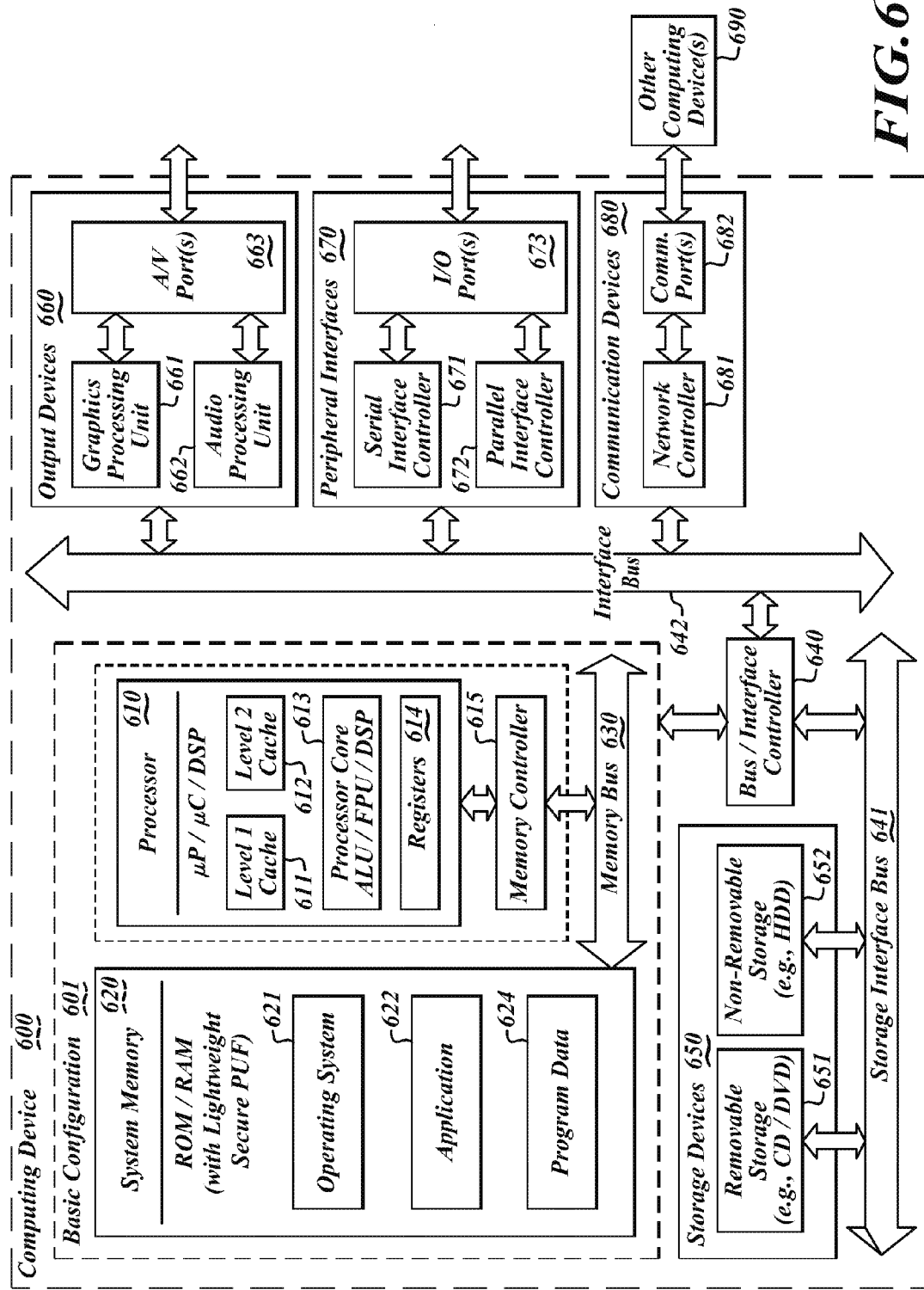
FIG. 6 illustrates a block diagram of a system having integrated circuits, all arranged according to various embodiments of the present disclosure.

FIG. 6 is a block diagram illustrating an example computing device configured in accordance with the present disclosure. In a very basic configuration 601, computing device 600 typically includes one or more processors 610 and system memory 620. A memory bus 630 may be used for communicating between the processor 610 and the system memory 620. System memory 620 may include ROM/RAM having an embodiment of the lightweight secure PUF having an input circuit, a configurable delay circuit and output circuit of the present disclosure, where the input circuit includes an input network, the configurable delay circuit includes one or more configurable delay chains, and the output circuit includes one or more arbiters. As described earlier, the output circuit may further include an output network. Each of the input and output networks may include combinatorial logic, sequential logic or another PUF.

Depending on the desired configuration, processor 610 may be of any type including but not limited to a microprocessor (μP), a microcontroller (μC), a digital signal processor (DSP), or any combination thereof. Processor 610 may include one more levels of caching, such as a level one cache 611 and a level two cache 612, a processor core 613, and registers 614. An example processor core 613 may include an arithmetic logic unit (ALU), a floating point unit (FPU), a digital signal processing core (DSP Core), or any combination thereof. An example memory controller 615 may also be used with the processor 610, or in some implementations the memory controller 615 may be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of device 600.

Computing device 600 may also include an interface bus 642 for facilitating communication from various interface devices (e.g., output interfaces, peripheral interfaces, and communication interfaces) to the basic configuration 601 via the bus/interface controller 640. Example output devices 660 include a graphics processing unit 661 and an audio processing unit 662, which may be configured to communicate to various external devices such as a display or speakers via one or more NV ports 663. Example peripheral interfaces 670 include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication device 680 includes a network controller 681, which may be arranged to facilitate communications with one or more other computing devices 690 over a network communication link via one or more communication ports 682.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configuration.

In alternate embodiments, beside ROM/RAM of System Memory 620, one or more of processor 610, graphics processing units 661, audio processing unit 662, and/or application specific integrated circuit or field programmable circuit used for control circuitry of storage devices 650, bus interface controller 640, serial interface controller 671, parallel interface controller 672, and network controller 681 may also include embodiments of the lightweight security PUF of the present disclosure.

The herein described subject matter sometimes illustrates different components or elements contained within, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Various operations may be described as multiple discrete operations in turn, in a manner that may be helpful in understanding embodiments; however, the order of description should not be construed to imply that these operations are order-dependent. Also, embodiments may have fewer operations than described. A description of multiple discrete operations should not be construed to imply that all operations are necessary. Also, embodiments may have fewer operations than described. A description of multiple discrete operations should not be construed to imply that all operations are necessary.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments of the disclosure may be implemented in a very wide variety of ways. This disclosure is intended to cover any adaptations or variations of the embodiments discussed herein. Therefore, it is manifestly intended that embodiments of the disclosure be limited only by the claims and the equivalents thereof.

What is claimed is:

1. A secured integrated circuit, the integrated circuit comprising:
   a physical unclonable function (PUF) including an input circuit, a configurable delay circuit, and an output circuit serially coupled together;
   wherein the configurable delay circuit comprises one or more configurable delay chains of serially coupled configurable switching-delay elements, where each configurable delay chain comprises two parallel paths adapted to receive two signals, configurably switch and propagate the two received signals along the two parallel paths, and output two delayed signals for the output circuit;
   wherein the input circuit comprises an input network coupled to the one or more configurable delay chains, where the input network includes combinatorial logic, sequential logic, or another PUF configured to accept N challenge bits and to output M configuration bits for the one or more delay chains based on the N challenge bits to configure the switching-delay elements of the configurable delay chains, where N and M are integers; and
   wherein the output circuit comprises one or more arbiters coupled to last switching-delay elements of the one or more delay chains, where the one or more arbiters are configured to output a signal based at least in part on relative arrival of the two delayed signals output by respective ones of the coupled last switching-delay elements.

2. The integrated circuit of claim 1, wherein the input network comprises combinatorial logic including two or more exclusive-or (XOR) logic elements, and wherein at least two of the XOR logic elements are configured to accept a shared challenge bit of the N challenge bits as input.

3. The integrated circuit of claim 1, wherein the configurable delay circuit comprises a plurality of configurable delay chains coupled to the input network, and wherein the output circuit comprises a plurality of arbiters coupled to the configurable delay chains in parallel.

4. The integrated circuit of claim 3, wherein the input network is configured to output different M configuration bits to each of the plurality of configurable delay chains, based at least in part on a unique order of the N challenge bits.

5. The integrated circuit of claim 4, wherein the input network is configured to rearrange the N challenge bits according to a circular-shift interconnection scheme to output the different M configuration bits to each of the plurality of configurable delay chains.

6. The integrated circuit of claim 3, wherein the output circuit further comprises an output network including combinatorial logic, sequential logic or another PUF coupled to the arbiters, and configured to receive output signals from the plurality of arbiters to generate a plurality of combined output signals, where each combined output signal is generated based on the output signals of a subset of the plurality of the arbiters.

7. The integrated circuit of claim 6, wherein the output network comprises combinatorial logic including a plurality of XOR logic elements coupled to the arbiters, wherein each XOR logic element is configured to perform XOR logic operations on the output signals of the subset of the plurality of the arbiters to generate one of the combined output signals.

8. The integrated circuit of claim 7, wherein each XOR logic element is configured to accept a unique combination of the output signals of the subset of the plurality of the arbiters as input.

9. A method to provide security for an integrated circuit, comprising:
   outputting, by an input network of an input circuit of a physical unclonable function (PUF) of the integrated circuit, M configuration bits based on N challenge bits to configure configurable switching-delay elements of one or more coupled configurable delay chains of the PUF, using combinatorial logic, sequential logic, or another PUF;
   receiving by the one or more configurable delay chains two input signals, configurably switching and propagating the two received signals along two parallel paths, and outputting two delayed signals; and
   receiving by one or more arbiters of an output circuit of the PUF the two delayed signals output by last switching-delay elements of the one or more configurable delay chains coupled to the one or more arbiters, and generating an output signal based at least in part on relative arrival of the two received delayed signals.

10. The method of claim 9, wherein outputting by an input network comprises performing, by the combinatorial logic, operations using a plurality of exclusive-or (XOR) logic elements, a subset of the plurality of XOR logic elements receiving shared ones of the N challenge bits as input.

11. The method of claim 9, wherein receiving comprises receiving two signals by each of the plurality of configurable delay chains, configurably switching and propagating the two signals along two parallel paths, and outputting two delayed signals; and generating comprises generating a plurality of output signals by a plurality of arbiters based on received delay signals from last switching-delay elements of the configurable delay chains.

12. The method of claim 11, wherein outputting by an input network comprises:
   outputting, by the input network, different M configuration bits to each of the configurable delay chains, based at least in part on a unique order of the N challenge bits.

13. A system with a secure integrated circuit, the system comprising:
   an input interface circuitry;
   an integrated circuit coupled to the input interface circuitry, wherein the integrated circuit includes a physical unclonable function (PUF) comprising an input circuit, a configurable delay circuit, and an output circuit serially coupled together;
   wherein the configurable delay circuit comprises one or more configurable delay chains of serially coupled configurable switching-delay elements, where the one or more configurable delay chains comprise two parallel paths adapted to receive two signals, configurably switch and propagate the two received signals along the two parallel paths, and output two delayed signals for the output circuit;
   wherein the input circuit comprises an input network coupled to the one or more configurable delay chains, where the input network includes combinatorial logic, sequential logic, or another PUF configured to responsively output M configuration bits to configure the switching-delay elements of the configurable delay chains, in response to N challenge bits provided to the input network; and wherein the output circuit comprises one or more arbiters coupled to last switching-delay elements of the one or more delay chains in parallel, wherein each arbiter is configured to output a signal based at least in part on relative arrival of the two delay signals output by the coupled last switching-delay element.

14. The system of claim 13, wherein the input network of the input circuit comprises combinatorial logic including two or more exclusive-or (XOR) logic elements, and wherein at least two of the XOR logic elements are configured to accept a shared challenge bit of the N challenge bits as input.

15. The system of claim 13, wherein the configurable delay circuit of the PUF comprises a plurality of configurable delay chains coupled to the input network, and wherein the output circuit of the PUF comprises a plurality of arbiters coupled to the configurable delay chains.

16. The system of claim 15, wherein the input network of the input circuit of the PUF is configured to re-arrange the N challenge bits according to a circular-shift interconnection scheme to generate the M configuration bits.

17. The system of claim 15, wherein the output circuit of the PUF further comprises an output network having combinatorial logic, sequential logic or another PUF coupled to the plurality of arbiters to generate a plurality of combined output signals, where the combined output signals are generated based on the output signals of a subset of the plurality of arbiters.

18. The system of claim 17, wherein the output network of the output circuit comprises combinatorial logic configured to perform one or more combinatorial logic operations on the output signals of the plurality of arbiters to generate the combined output signals, wherein the combinatorial logic includes two or more XOR logic elements, each XOR logic element is configured to accept a unique combination of the output signals of the arbiters as input.

* * * * *

UNITED STATES PATENT AND TRADEMARK OFFICE
CERTIFICATE OF CORRECTION

PATENT NO. : 8,054,098 B2  
APPLICATION NO. : 12/984275  
DATED : November 8, 2011  
INVENTOR(S) : Koushanfar et al.

Page 1 of 1

It is certified that error appears in the above-identified patent and that said Letters Patent is hereby corrected as shown below:

In the Specification

In Column 2, Line 46, delete "equivalents" and insert -- equivalents. --, therefor.

In Column 5, Line 11, delete "$r_i$," and insert -- $r_i$ --, therefor.

In Column 5, Line 17, delete "$\delta i$" and insert -- $\delta_i$ --, therefor.

In Column 5, Line 25, delete "$\Gamma k\ (\Lambda k)$" and insert -- $\Gamma_k(\Lambda_k)$ --, therefor.

In Column 5, Line 26, delete "$\Gamma k$" and insert -- $\Gamma_k$ --, therefor.

In Column 5, Line 27, delete "$\Lambda k$" and insert -- $\Lambda_k$ --, therefor.

In Column 5, Line 27, delete "(ck)" and insert -- $c_k$ --, therefor.

In Column 5, Line 42, delete "$p_j$," and insert -- $p_j$ --, therefor.

In Column 7, Line 22, delete "$(i)_1$" and insert -- (i), --, therefor.

In Column 7, Line 24, in Equation (5), delete "$=c_i^m$" and insert -- $c_i^m$ --, therefor.

In Column 7, Line 41, delete "$Q'<Q_1$" and insert -- $Q'<Q$, --, therefor.

In Column 8, Line 60, delete "NV" and insert -- A/V --, therefor.

Signed and Sealed this  
Twenty-seventh Day of August, 2013

Teresa Stanek Rea  
*Acting Director of the United States Patent and Trademark Office*